Sept. 29, 1942. H. B. BELL 2,297,528
FRAUD PREVENTION DEVICE FOR METERS
Filed Dec. 12, 1941 2 Sheets-Sheet 1
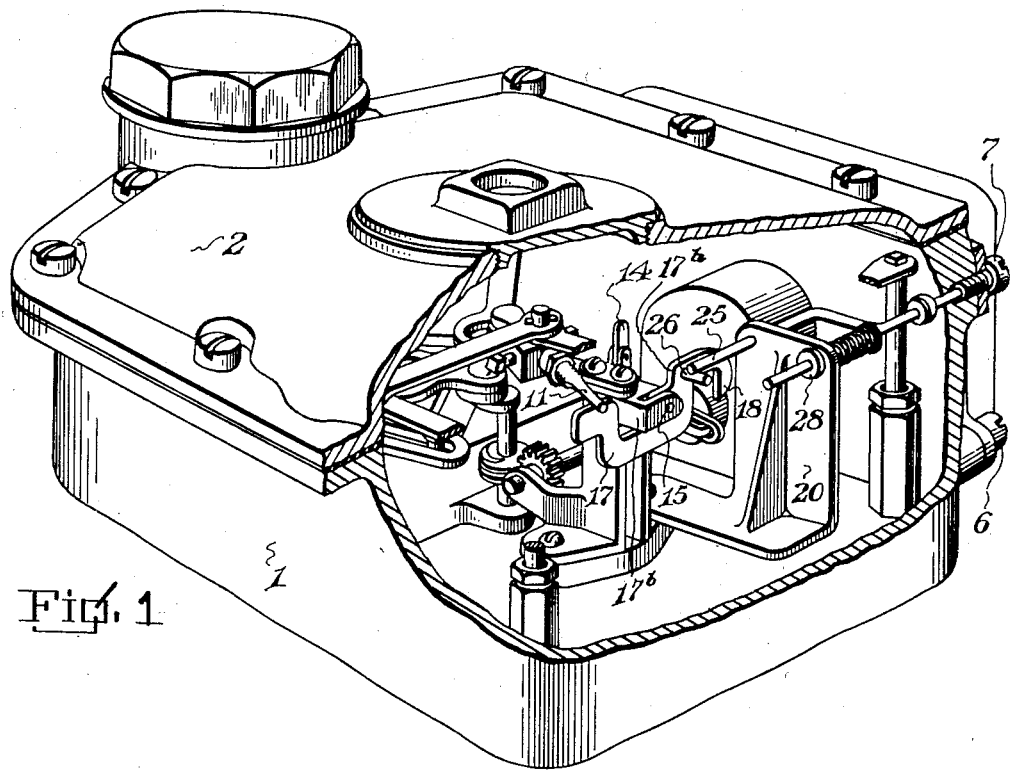
Fig. 1
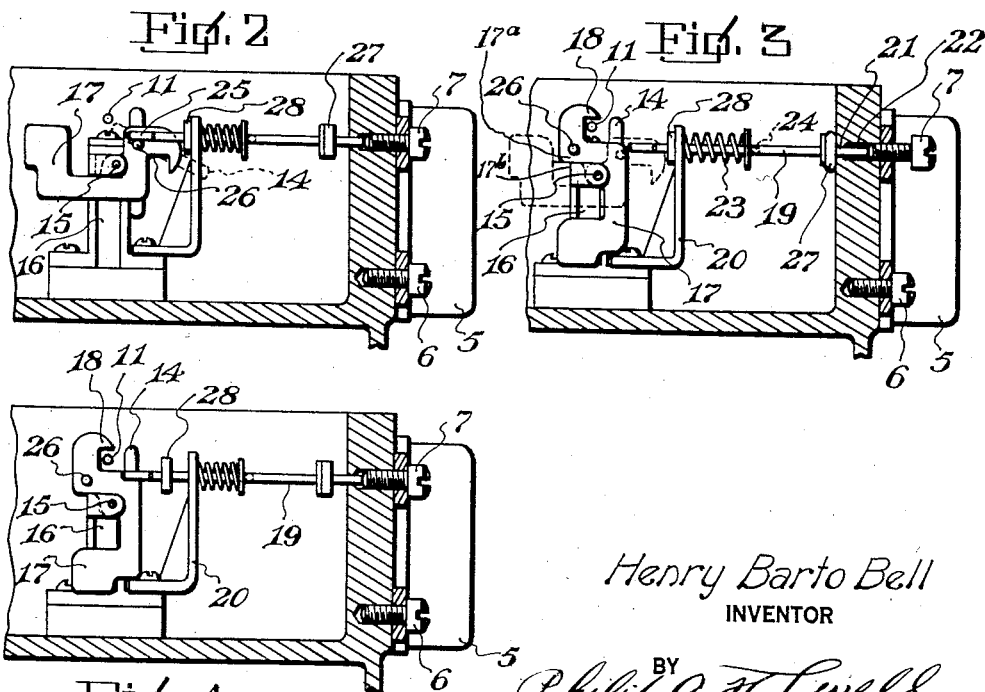
Fig. 2 Fig. 3
Fig. 4
Henry Barto Bell
INVENTOR
BY Philip A. H. Purell
ATTORNEY Sept. 29, 1942.  H. B. BELL  2,297,528
FRAUD PREVENTION DEVICE FOR METERS
Filed Dec. 12, 1941  2 Sheets-Sheet 2

Henry Barto Bell
INVENTOR

BY
ATTORNEY

Patented Sept. 29, 1942

2,297,528

UNITED STATES PATENT OFFICE 2,297,528

FRAUD PREVENTION DEVICE FOR METERS

Henry Barto Bell, Tulsa, Okla.

Application December 12, 1941, Serial No. 422,775

10 Claims. (Cl. 73—272)

The invention relates to fraud prevention devices for meters, particularly gas meters, and has for its object to provide means whereby the meter is automatically stopped when an unauthorized person attempts to remove the index box cover to tamper with the index dial, and prevents the starting of the meter when the cover is placed in position.

A further object is to so construct and arrange the fraud prevention device whereby the meter is stopped and held stopped when one of the cover screws is unscrewed and again replaced.

A further object is to provide the index box cover with means which will compel the unscrewing of the screw entirely, and at the same time will prevent the index box cover from being pivotally moved on the control screw when the other screws are removed.

A further object is to provide a spring actuated push rod extending into the screw hole and normally forced toward the screw and the push rod with an off set arm in the path of a pin of a gravity actuated latch, which, when released, is in the path of the rotating tangent arm of the meter for holding the meter against operation.

A further object is to provide the push rod with a frictionally held washer which normally engages the push rod bracket and which is displaced when a fraud is attempted and acts as an indicating means to the meter inspector that the meter has been tampered with.

A further object is to so construct and arrange the fraud prevention device so that the meter structure is not changed excepting the boring of a hole for the push rod in the bottom of one of the screw holes holding the index cover in position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the meter with part of the casing broken away to show the fraud prevention device.

Figure 2 is a vertical longitudinal sectional view through one side of the meter showing the fraud prevention device in cocked position for normal operation.

Figure 3 is a view similar to Figure 2, but showing the device tripped.

Figure 4 is a view similar to Figures 2 and 3 but showing the push rod and fraud indicating washer in position after the screw has been replaced.

Figure 5:
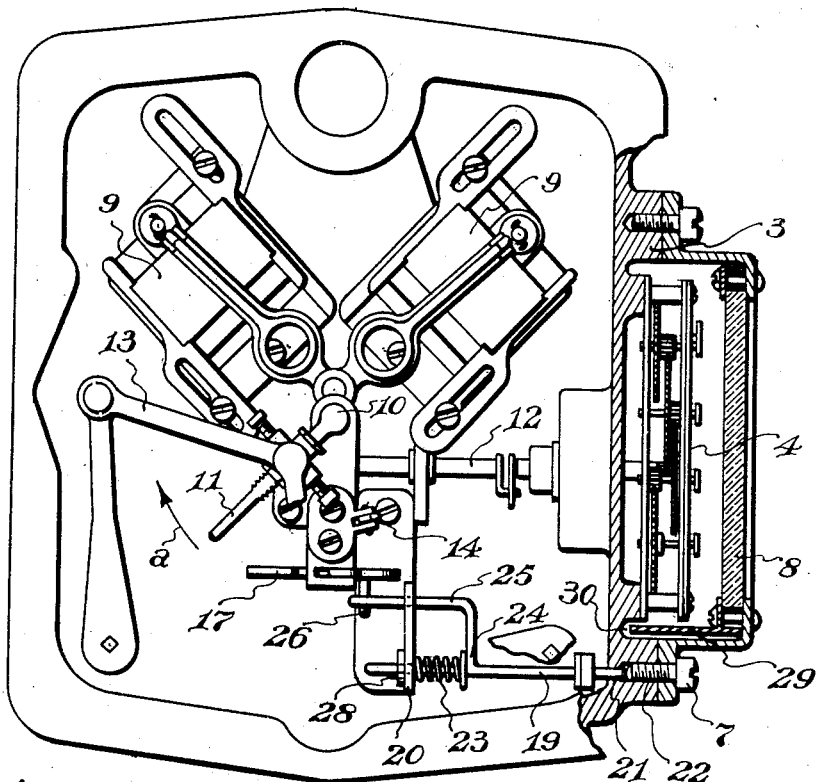
Figure 5 is a top plan view of the meter mechanism with the cover plate removed and the index box shown in section.
Figure 6:
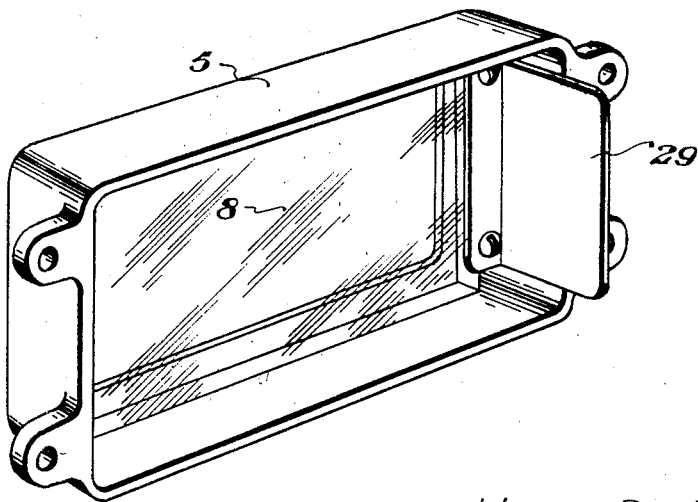
Figure 6 is a perspective view of the index box cover.

Referring to the drawings, the numeral 1 designates the meter casing, and which casing is provided with a cover 2. One side of the casing 1 is provided with an index box 3 having index dial 4 therein and the box is in turn provided with a removable cover 5, secured in position by means of screws 6 and 7. Cover 5 is provided with a conventional form of glass panel 8 through which the index dial can be read in the usual manner. Disposed within the casing 1 are front and rear valves 9 which control mechanism for rotating the tangent arm 11 on crank shaft 10 clockwise in the direction of the arrow $a$. This mechanism also controls the index dial mechanism through the axial shaft 12 in the usual manner. A flag arm link 13 is also provided. The above mechanism is standard equipment in meters, including the upwardly extending pivoted click arm 14 past which the tangent arm passes in its clockwise movement, however the click 14 prevents anticlockwise movement of the tangent arm.

Pivotally mounted at 15 on the bracket 16 within the meter is a gravity actuated latch 17, which, under normal conditions is out of the path of the tangent arm 11 shown in Figure 2. When the meter has been tampered with the latch 17 swings to the positions shown in Figures 3 and 4 with its hooked end 18 upwardly so that the tangent arm is held against rotation; consequently the operation of the meter is stopped. It will be noted that the stopped position is between the hook 18 and the click 14.

To again start the meter the click is moved to the dotted line position shown in Figure 2 and the gravity actuated latch 17 is cocked in the position shown in Figure 2, and held in cocked position by mechanism about to be described. The mechanism for holding and releasing the latch 17 comprises a push rod 19, slidably mounted in a bearing of a supporting bracket 20. The outer end of the push rod 19 is slidably mounted in an aperture 21 in the bottom of a screw hole 22 into which the cover screw 7 is threaded. The push rod 19 is normally forced in the direction of screw 7 by means of an expansion spring 23, which is interposed between the bracket and the outwardly extending portion 24 of an off set trip arm 25. The off set trip arm 25 is also slidably mounted in a bearing of a bracket 20 and overlies an outwardly extending pin or lug 26 carried by the latch 17. When the screw is screwed all the way in the arm 25 holds the counterweighted latch in a horizontal position as shown in Figure 2 against the action of the expansion spring 23. If an unauthorized person removes the screw 7 to remove the cover and tamper with the index mechanism, the push rod will follow the screw outwardly under the influence of the expansion spring 23 and the off set arm 25 will move out of the path of the pin 26, clearly shown in Figure 3 and the tangent arm 11, on its next revolution, after passing the click 14, will be caught by the hooked end 18 of the latch, clearly shown in Figure 3. Push rod 19 is provided with a resilient washer 27 which will seal the aperture 21 and prevent leakage of gas through the screw hole. The position of the parts is illustrated in Figure 3.

As the push rod 19 moves outwardly for a meter stopping operation a friction washer 28 is axially moved on the rod 19 by engagement with the bracket 20, and when the screw 7 is again screwed inwardly by the unauthorized person, the washer will assume the position shown in Figure 4, which would indicate to the meter inspector that the meter had been tampered with. This indicating means would be actuated on the slightest movement of the screw 7 even though the screw is not unscrewed to an extent that would trip the latch 17. The latch 17 comprises a hooked portion on one side of the pivot 15 and a weighted portion on the other side of the pivot 15. After the meter has been inspected and set, following a fraululent tampering the washer 28 is again pushed to position against the bracket 20, shown in Figure 2. The latch 17 is held against counterclockwise movement as shown in Figure 3 by the engagement of the shoulders 17a thereof with the bracket 17b.

It has been found desirable to provide means whereby the index box cover can not be pivotally moved on the screw 7 as a pivotal point, and at the same time compel the fraudulent operator to unscrew the screw 7 to a substantial distance, so that the latching mechanism will operate. To accomplish this result a relatively wide plate 29 is provided within the cover 5 and this plate extends into a channel 30 in the meter box, and as the plate 29 is wider than the depth of the chamber of the cover it is obvious the screw 7 would have to be practically removed before the cover could be pivoted thereon after the other screws 6 are removed.

From the above it will be seen that a fraud prevention mechanism is provided for meters which is simple in construction, positive in its operation, and one wherein the device may be applied to a conventional form of meter without modifying the construction of the meter.

The invention having been set forth what is claimed as new and useful is:

1. In combination, a meter casing having an index box, meter mechanism in said casing, an index mechanism secured in said box, a cover on said box for said index mechanism, screws securing said cover to said box, latching mechanism, normally inoperative, for preventing the operation of said meter mechanism, and means operative in response to the removal of one of said screws to render said latching mechanism operative to prevent the operation of said meter mechanism.

2. A device as set forth in claim 1 wherein the latching mechanism comprises a gravity actuated latch, and said meter mechanism includes a rotatable tangent arm, said latching mechanism having a portion which moves into the path of the tangent arm when the latch is released 3. A device as set forth in claim 1 wherein the means controlled by the screw comprises a push rod extending into the screw hole, spring means for normally forcing said push rod towards the screw, an off set latch holding arm carried by the push rod and cooperating with the latching mechanism for holding the same in inoperative position when the screw is in tightened position and releasing the latching mechanism when the screw is loosened.

4. A device as set forth in claim 1 wherein the meter mechanism is provided with a rotatable tangent arm, and said latching mechanism includes a pivoted latch adjacent said tangent arm and gravity actuated, said latch having a portion movable into the path of the tangent arm when the latch is released, and said means includes a push rod actuated by said meter cover screw, spring means for normally forcing said push rod towards the screw, an off set arm carried by the push rod, said off set arm cooperating with the gravity actuated latch for maintaining the same inoperative out of the path of the tangent arm when the screw is tightened and releasing said latch when the screw is unscrewed.

5. The combination with a meter mechanism including a tangent arm disposed within a casing, a removable index cover carried by the casing, a screw for holding said index cover in position, of means for stopping said mechanism through the stopping of rotation of the tangent arm when the screw is unscrewed, said stopping means comprising a gravity actuated latch member adjacent the tangent arm and held out of the path thereof until released, a push rod extending into the screw hole and into engagement with said screw, spring means for forcing said push rod towards the screw, an off-set arm carried by the push rod and normally holding the latch member in inoperative position until the screw is unscrewed and the push rod forced towards the same by the spring means.

6. A device as set forth in claim 5 including a supporting bracket for the push rod and off-set arm and a friction washer on said push rod and adapted to be moved on the push rod in relation to the bracket upon movement of the push rod by unscrewing the screw and tightening the screw.

7. A device as set forth in claim 5 including a resilient sealing washer carried by the push rod and adapted to seal the aperture through which the push rod extends to engagement with the screw.

8. A device as set forth in claim 5 including a pivoted click carried by the meter mechanism, said latch member being positioned whereby it will stop and hold the tangent arm between the latch and click.

9. A device as set forth in claim 5 in which said latch member is pivoted, said device including an outwardly extending lug carried by one side of the pivoted latch member above its pivotal point and with which the offset arm cooperates.

10. A device as set forth in claim 5 including a member carried within the index cover and extending a substantial distance beyond the inner face of the cover and into the casing and forming means whereby said screw can not be partially loosened and used as a pivotal point for the cover on the casing.

HENRY BARTO BELL.